Nov. 6, 1928.
H. B. TAYLOR
1,691,000
GOVERNOR TRANSMISSION FOR TRAIN CONTROL SYSTEMS
Filed Nov. 26, 1926     4 Sheets-Sheet 2
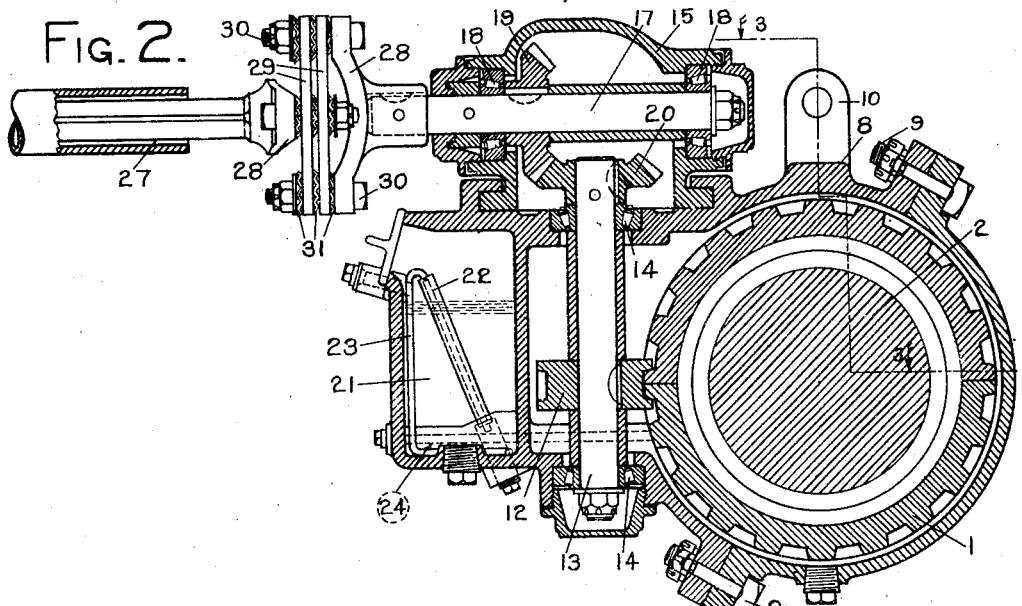
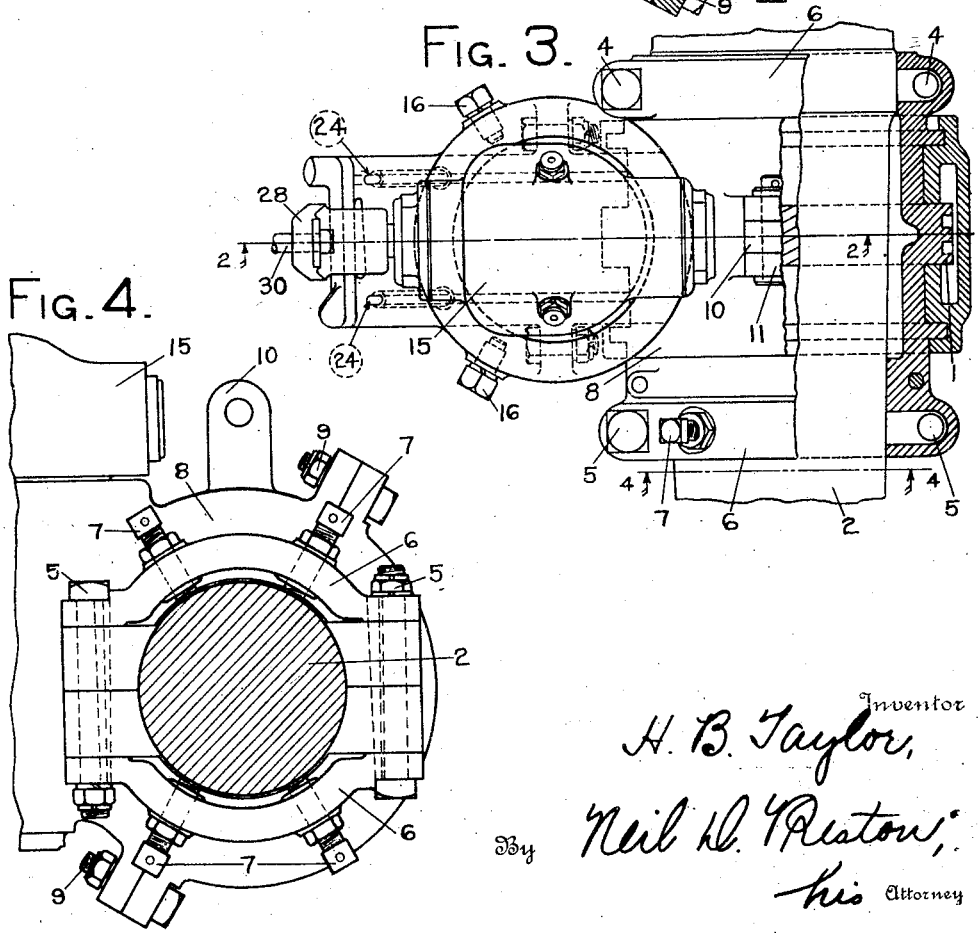
Inventor
H. B. Taylor,
By Neil D. Preston,
his Attorney

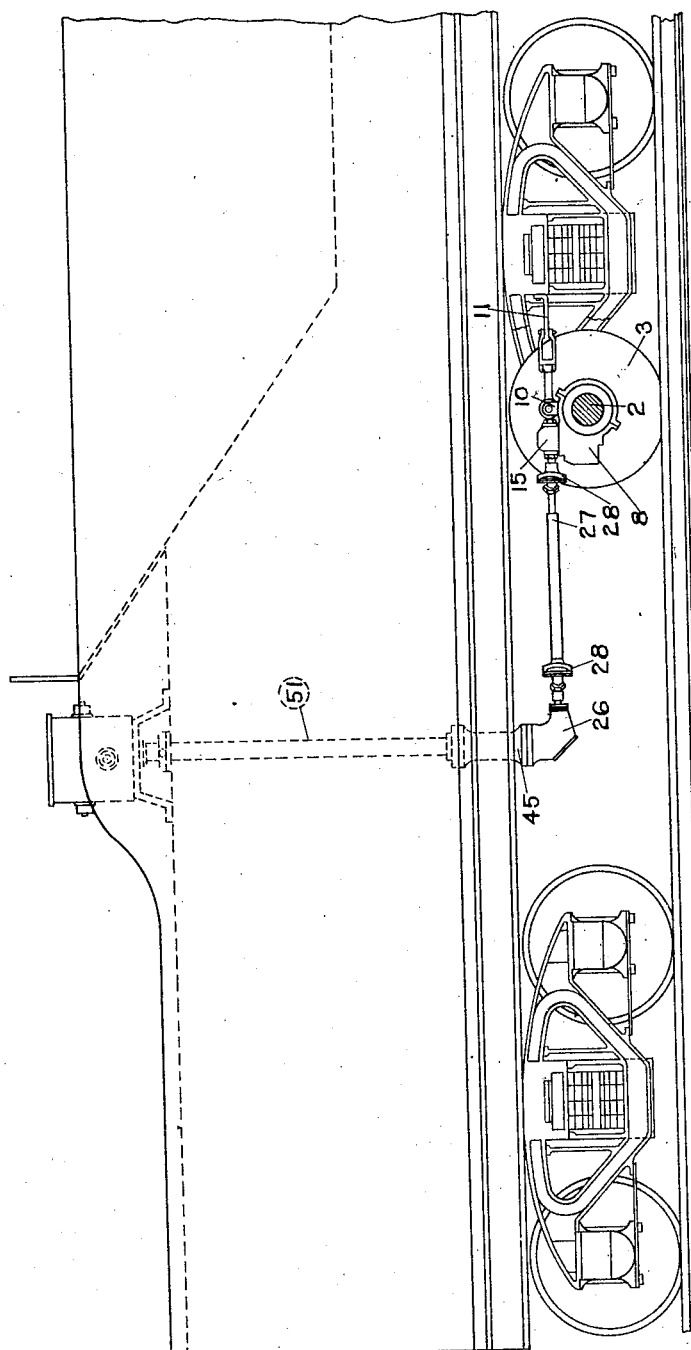

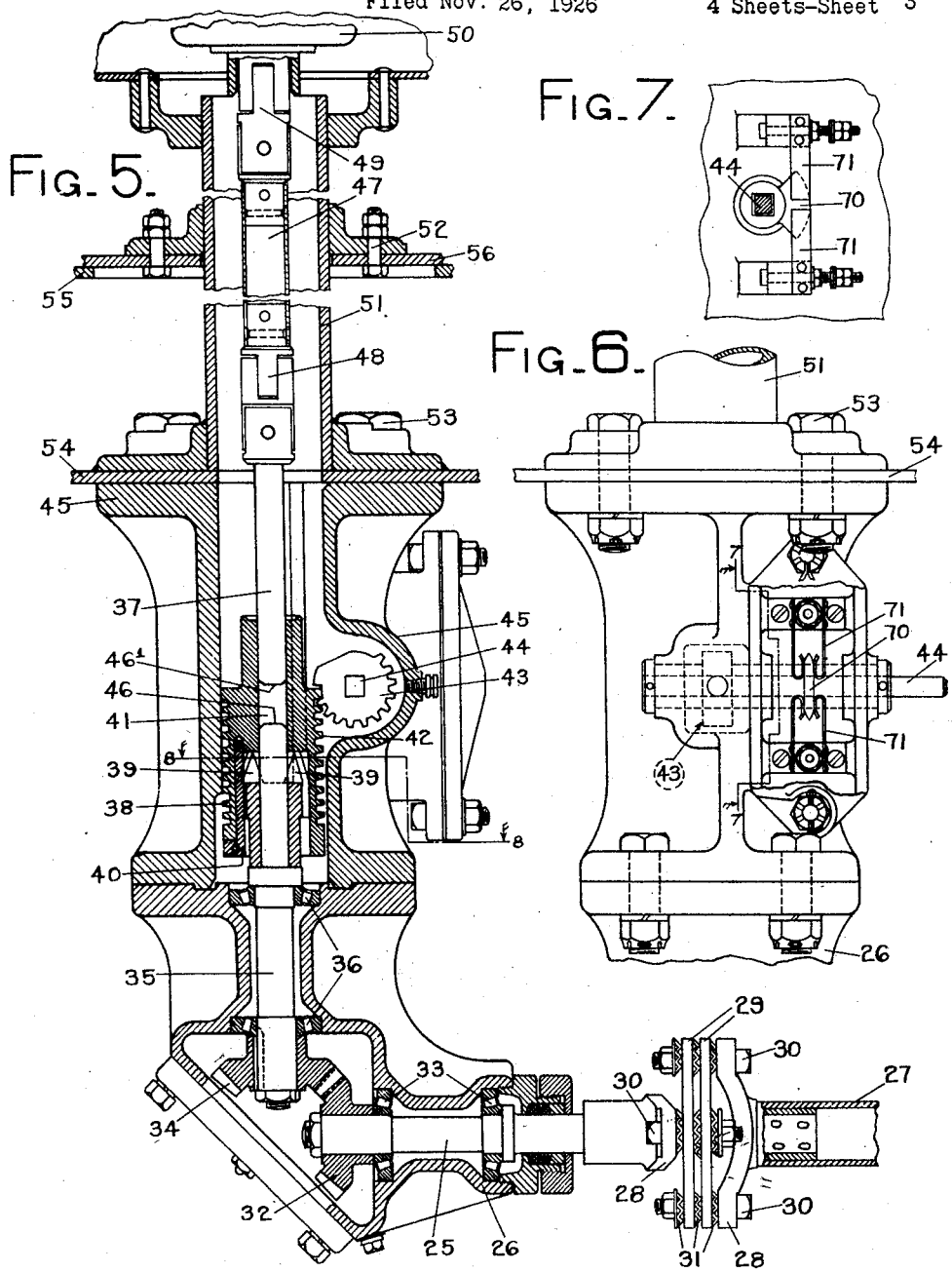

Nov. 6, 1928.

H. B. TAYLOR 1,691,000

GOVERNOR TRANSMISSION FOR TRAIN CONTROL SYSTEMS

Filed Nov. 26, 1926 4 Sheets-Sheet 4

Inventor
H. B. Taylor,
By Neil D. Preston,
his Attorney

Patented Nov. 6, 1928.

1,691,000

UNITED STATES PATENT OFFICE.

HERBERT B. TAYLOR, OF ROCHESTER, NEW YORK, ASSIGNOR TO GENERAL RAILWAY SIGNAL COMPANY, OF ROCHESTER, NEW YORK.

GOVERNOR TRANSMISSION FOR TRAIN-CONTROL SYSTEMS.

Application filed November 26, 1926. Serial No. 150,839.

This invention relates in general to automatic train control, and has more specific reference to a transmission drive from a railway vehicle axle to a speed responsive device mounted on the vehicle.

In many automatic train control systems, it is desirable to have a speed responsive device carried by the vehicle, driven at a speed proportional to the speed of the vehicle, means being associated with the speed responsive device for initiating operation of control devices dependent upon the vehicle speed, or distance traversed, or both. Such speed responsive device may be a usual fly ball governor, for example, mounted on the vehicle, and driven from its axle, and arranged to initiate functioning of various instrumentalities in accordance with speed attained, or distance traversed, or both.

With the above and other considerations in mind, it is proposed, in accordance with this invention, to provide a car axle transmission drive for a speed responsive device, with means for disconnecting the drive at will and simultaneously breaking an energizing circuit for train-control apparatus used in connection with the speed responsive device.

Further objects, purposes, and characteristic features of the invention will appear as the description thereof progresses, reference being had to the accompanying drawings, showing, solely by way of illustration, one embodiment of the invention.

In the drawings:—

Fig. 1 is a side elevation, with parts broken away, of a device, according to the invention, applied to a railway vehicle:

Fig. 2 is a sectional view, substantially on line 2—2 of Fig. 3, viewed in the direction of the arrows:

Fig. 3 is a sectional view, substantially on line 3—3 of Fig. 2, with parts left in plan, and viewed in the direction of the arrows:

Fig. 4 is a sectional view, substantially on line 4—4 of Fig. 3, viewed in the direction of the arrows:

Fig. 5 is a vertical sectional view of part of the transmission and the clutch:

Fig. 6 is a side elevation, with parts broken away, of a switch operated in connection with the transmission clutch;

Fig. 7 is a sectional view, substantially on line 7—7 of Fig. 6, viewed in the direction of the arrows:

Figure 9:
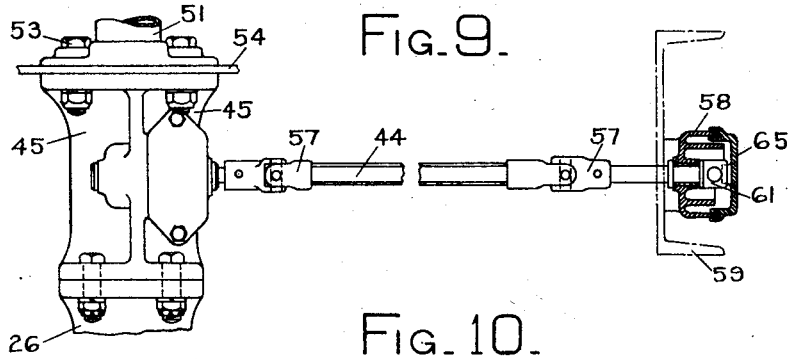
Fig. 9 is an elevational view, with parts shown in section, of the operating means for the switch and clutch.
Figure 10:
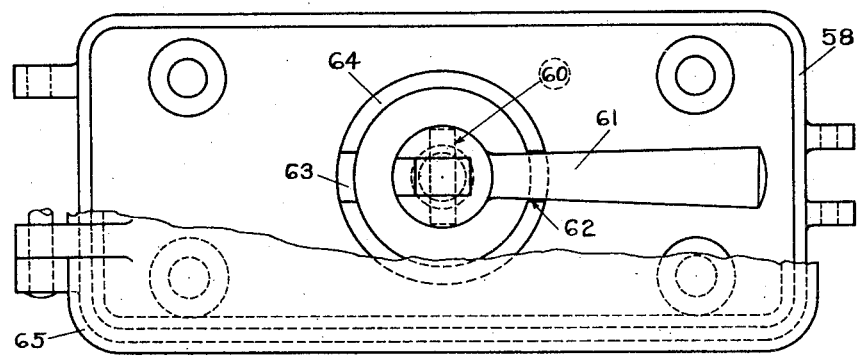
Fig. 10 is a top plan view, with parts broken away, of the clutch operating handle and adjacent parts.

In general, the described embodiment of the present invention includes a spiral drive gear, fixed to a vehicle axle, and connected up through shafts and gears to a speed responsive device mounted on the vehicle, there being a disconnect clutch in the drive transmission between the axle and the speed responsive device, provided with an operating handle arranged to cut off the supply of electrical energy to train control means, simultaneously with the operation of the clutch to disconnect the axle drive from the driven device.

More particularly, and referring to the drawings, a two part spiral drive gear 1 is fixed to the axle 2 of a locomotive tender, inwardly of the running wheels 3, by bolts 4 clamping the two halves of the gear at one end, and bolts 5 clamping the other ends of the two gear halves together, and to two yokes 6, which latter are fitted with four set screws 7 for fixing the yokes of the axle 2. The drive gear is thus tightly clamped to the axle, and is further held from relative rotation thereto, by the set screws 7.

Encircling the gear and shaft, is a two part casing 8 clamped together by bolts 9 and held against rotation by an integral arm 10 connected, by suitable rods 11, to a fixed part of the vehicle truck frame.

A spiral pinion 12 meshes with the gear 1, and is keyed to a vertical shaft 13, mounted in the casing 8, in roller bearings 14.

On top of casing 8, is a turret casing 15, rotatable about a vertical axle for obtaining proper alignment of parts, and held in adjusted position by set screws 16. Within the turret casing, is a horizontal shaft 17, mounted in roller bearings 18, and carrying keyed to it, a bevel gear 19 meshing with a like gear 20 on the upper end of shaft 13.

Within the casing 8 is an oil chamber 21, containing wick tubes 22, fitted with wicks 23 extending out of the upper ends of the wick tubes. Other wicks 24, positioned horizontally, contact with the tube or inner ends, of wicks 23 and extend to the bearing of the drive gear 1. With oil in chamber 21 maintained at a level slightly below the open upper ends of wick tubes 22, proper lubrication of the drive gear bearing, and adjacent parts, is obtained by the oil passing up through the vertical wicks 23, down through the tubes 22 and then along the horizontal wicks 24, to the bearing of gear 1.

The horizontal shaft 17 is connected to drive a shaft 25, in a bevel gear casing 26, by means of a universal shaft connection including a telescopic joint 27, and two universal joints. Each universal joint includes two spiders 28, fixed to the adjacent ends of the shafts to be connected, and displaced from each other, by a rotation angle of 90°. Each spider is connected, at each of its ends, to two drive discs 29, by bolts 30, with spring washers 31 positioned, between the discs, and between the discs and spiders. In this manner a limited universal movement is possible, while always maintaining a relatively firm joint.

A bevel gear 32 is keyed to the shaft 25 which is carried in roller bearings 33, and meshes with a like gear 34, keyed to a vertical shaft 35, supported in roller bearings 36.

The shaft 35 is arranged to drive a shaft 37, through a disconnect clutch. This clutch includes a toothed member 38, fixed to the shaft 35, and having converging faced teeth 39 arranged to guide a finger 40, carried by a cylindrical rack member 41, slidable on shaft 37, and having teeth 42 engaged by a toothed sector 43, carried on a shaft 44 journalled in the housing 45 of the disconnect clutch. The shafts 35 and 37, to be coupled and uncoupled by the clutch, are square in cross section, and have ends 46, 46¹ terminating adjacent each other. In operation, rotation of sector 43 raises or lowers the coupling rack member 41, to either connect up, or disconnect, the two square shaft ends 46, 46¹, the finger 40 engaging between any two adjacent teeth 39 to cause accurate registry of the square opening in rack member 41, with the end 46 of shaft 35.

The shaft 37 is connected through a rod 47, by universal joints 48 and 49, to a speed responsive device 50, shown wholly diagrammatically. This drive connection is housed in a tube 51, suitably connected, at 52 and 53, to the bottom and top sheets 54 and 55, respectively, of the tender tank, a reenforcing plate 56 being used in the connection to the top sheet.

As shown best in Fig. 9, the shaft 44 extends horizontally from the casing 45, and is made up of a plurality of members connected together by universal joints 57. The outer end of shaft 44 is received in an operating casing 58, connected to a channel 59 forming part of the tender frame. Pivotally connected at 60 to the end of shaft 44 is an operating handle 61, arranged to be held in either of its two operated positions, in notches 62 and 63 in an upstanding collar 64, integral with the casing and extending inwardly thereof. A hinged cover 65, for the casing, is adapted to be fastened in place by a lockable spring hasp 66.

Figure 11:
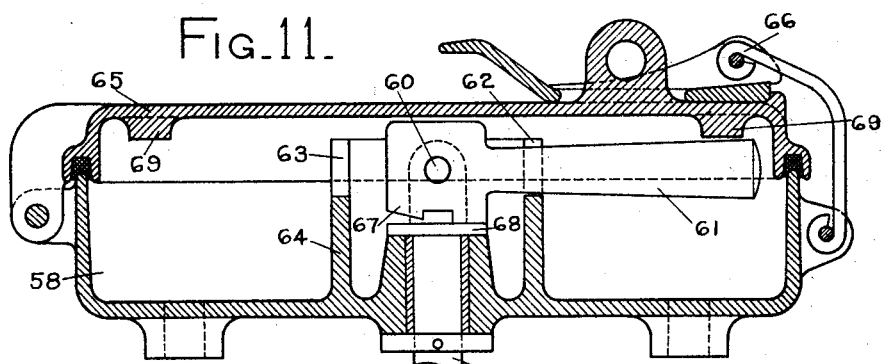
Fig. 11 is a sectional view, with parts shown in elevation, of the parts shown in Fig. 10.
Figure 8:
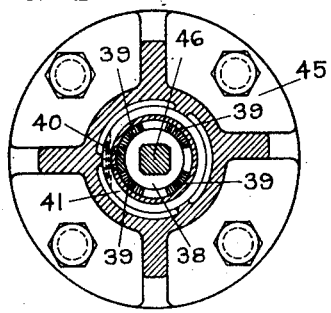
Fig. 8 is a sectional view, substantially on line 8—8 of Fig. 5, viewed in the direction of the arrows.

As seen from Fig. 11, the handle 61 must be raised free from its holding notch 62, by pivoting it about point 68, before it can be swung around approximately 180° and then dropped into the other holding notch 63, to thus rock shaft 44; and to permit this pivoting of the handle, the casing cover 65 must be unlocked and raised out the way of the handle. A face 67 on the handle, contacts with a stop 68, to limit the pivoting movement of the handle, while lugs 69, on the inside of the cover 65, operate to hold the handle in each of its operative positions, within the notches 62 and 63. In this manner, operation of the handle 61, to operate the drive shaft disconnect clutch, is prevented, except by authorized persons, and it is thus assured that such handle must be properly in one or the other of its operative positions, when the cover 65 is closed on the casing.

Also connected to shaft 44 is an electrically conductive contact sector 70, operable to make and break an electric circuit, including the cooperating contacts 71, which controls flow of energy to the train control apparatus with which the axle driven speed responsive device is used.

As shown in Figs. 5, 7, and 11, when the drive clutch is in, the circuit to the train control apparatus is established, and the operating handle 61 is in its right hand position, as viewed in Fig. 11.

Thus a ready and reliable means has been provided for driving a speed responsive device from a car axle, and for disconnecting the drive from the axle and simultaneously breaking an energizing circuit for the train control apparatus with which the speed responsive device is used.

The above rather specific description of one form of this invention has been given solely by way of illustration, and is not intended, in any manner whatsoever, in a limiting sense. Obviously, the invention can assume many different physical forms and is susceptible of numerous modifications, and all such forms and modifications are intended to be included by this invention, as come within the scope of the appended claims.

Having described my invention, I now claim:—

1. In a train control system, a speed responsive device, drive means for the device driven from a railway vehicle axle, a disconnect clutch for the drive means, an electric switch controlling energy supply to the train control system, and a single manually operable means for simultaneously disconnecting the clutch and opening the switch.

2. In a train control system, a speed responsive device, drive means for the device driven from a railway vehicle axle, a disconnect clutch for the drive means, an electric switch controlling energy supply to the train control system, and a single operating means for simultaneously operating the clutch and switch either to open the switch and disconnect the clutch, or to close the switch and connect the clutch whereby to cut the train control system out of, and into, operation.

3. In a train control system, a speed responsive device, drive means for the device driven from a railway vehicle axle, a disconnect clutch for the drive means, an electric switch controlling energy supply to the train control system, and a single operating means for the clutch and the switch, the drive means including, a casing clamped around a vehicle axle and held against rotation, a split gear clamped to the axle, an oil compartment in the casing, and wick means to feed oil to the gear bearing.

4. In a train control system, a speed responsive device, drive means for the device driven from a railway vehicle axle, a disconnect clutch for the drive means, an electric switch controlling energy supply to the train control system, and a single operating means for the clutch and the switch, the drive means including, a casing clamped around the axle and held against rotation, a split gear clamped to the axle, an oil compartment in the casing, and wick means to feed oil to the gear bearing, the two parts of the gear being bolted together at one end, opposed yokes held to the axle by set screws, the two parts of the gear at the other end being bolted to each other and to the yokes.

5. In a train control system, a speed responsive device, drive means for the device driven from a railway vehicle axle, a disconnect clutch for the drive means, an electric switch controlling energy supply to the train control system, and a single operating means for the clutch and the switch, the clutch comprising, two noncircular shafts having ends terminating adjacent each other, a correspondingly apertured toothed sleeve slidable to at times connect up the said ends, a sector for sliding the sleeve, and guide means for causing accurate registry of the sleeve aperture with one of the shaft ends.

6. In a train control system, a speed responsive device, drive means for the device driven from a railway vehicle axle, a disconnect clutch for the drive means, an electric switch controlling energy supply to the train control system, and a single operating means for the clutch and the switch, the clutch comprising, two non-circular shafts having ends terminating adjacent each other, an apertured toothed sleeve slidable to at times connect up the said ends for joint rotation, a sector for sliding the sleeve, and guide means for causing accurate registry of the sleeve aperture with one of the shaft ends, the guide means including, a fixed collar on one shaft, converging faced teeth on the collar, and a guide finger fixed to the sleeve and receivable between any two adjacent teeth.

7. In a train control system, a speed responsive device, drive means for the device driven from a railway vehicle axle, a disconnect clutch for the drive means, an electric switch controlling energy supply to the train control system, a manually operable member for operating the clutch and the switch, a casing for the member, a cover for the casing, and means preventing fitting the cover onto the casing unless the member is in one of its operated positions.

8. In a train control system, a speed responsive device, drive means for the device driven from a railway vehicle axle, a disconnect clutch for the drive means, an electric switch controlling energy supply to the train control system, and a single operating means for the clutch and the switch, the switch operating means including a shaft, a contact segment on the shaft, contacts bridgeable by the contact segment to close a circuit, and a toothed segment on the shaft for operating the disconnect clutch.

9. In a train control system, a speed responsive device, drive means for the device driven from a railway vehicle axle, a disconnect clutch for the drive means, an electric switch controlling energy supply to the train control system, and a single operating means for the clutch and the switch, the switch operating means including a shaft, a contact segment on the shaft, and contacts bridgeable by the contact segment to close a circuit, a casing receiving one end of the shaft, a handle pivoted to the shaft, a cover for the casing, a collar in the casing around the end of the shaft, notches in the collar receiving the handle and requiring pivoting of the handle out of the notches before rotation of the handle and shaft is possible, the casing cover being positioned to prevent pivoting of the handle when in closing position on the casing.

10. In a train control system, a speed responsive device drive means for the device driven from a railway vehicle axle, a disconnect clutch for the drive means, an electric switch controlling energy supply to the train control system, and a single operating means for the clutch and the switch, the switch operating means including, a shaft, a contact segment on the shaft, and contacts bridgeable by the contact segment to close a circuit, a toothed segment on the shaft for operating the disconnect clutch, a casing receiving one end of the shaft, a handle pivoted to the shaft, a cover for the casing, a collar in the casing around the end of the shaft, notches in the collar receiving the handle and requiring pivoting of the handle out of the notches before rotation of the handle and shaft is possible, the casing cover being positioned to prevent pivoting of the handle when in closing position on the casing.

11. In a train control system, a speed responsive device, drive means for the device driven from a railway vehicle axle, a disconnect clutch for the drive means, an electric switch controlling energy supply to the train control system, a shaft for operating the clutch and switch, a casing receiving one end of the shaft, a handle pivoted to the shaft, a cover for the casing, a collar in the casing around the end of the shaft, notches in the collar receiving the handle and requiring pivoting of the handle out of the notches before rotation of the handle and shaft is possible, the casing cover being positioned to prevent pivoting of the handle when in its closing position on the casing.

12. In a train control system, a speed responsive device, drive means for the device driven from a railway vehicle axle, a disconnect clutch for the drive means, an electric switch controlling energy supply to the train control system, a shaft for operating the clutch and switch, a casing receiving one end of the shaft, a handle pivoted to the shaft, a cover for the casing, a collar in the casing around the end of the shaft, notches in the collar receiving the handle and requiring pivoting of the handle out of the notches before rotation of the handle and shaft is possible, the casing cover being positioned to prevent pivoting of the handle when in its closing position on the casing, and means for locking the cover on the casing.

In testimony whereof I affix my signature.

HERBERT B. TAYLOR.